United States Patent
Kang et al.

(10) Patent No.: US 7,667,790 B2
(45) Date of Patent: Feb. 23, 2010

(54) LIQUID CRYSTAL DISPLAY DEVICE COMPRISING A FILTER LAYER LYING IN A SAME PLANE AS A SELF-LUMINOUS BODY INCLUDING A FIRST ELECTRODE, AN ORGANIC SUBSTANCE LAYER AND A SECOND ELECTRODE

(75) Inventors: Chang Heon Kang, Kyoungki-do (KR); Jin Young Chun, Seoul (KR)

(73) Assignee: Hydis Technologies, Co., Ltd, Gyeonggi-Do (KR)

( * ) Notice: Subject to any disclaimer, the term of this patent is extended or adjusted under 35 U.S.C. 154(b) by 100 days.

(21) Appl. No.: 11/595,469

(22) Filed: Nov. 9, 2006

(65) Prior Publication Data
US 2007/0115408 A1    May 24, 2007

(30) Foreign Application Priority Data
Nov. 24, 2005    (KR) .................. 10-2005-0113062

(51) Int. Cl.
*G02F 1/1335*    (2006.01)
*H01J 63/04*    (2006.01)
*H01J 1/62*    (2006.01)

(52) U.S. Cl. .................. 349/69; 349/106; 349/113; 313/504

(58) Field of Classification Search ............. 349/113
See application file for complete search history.

(56) References Cited

U.S. PATENT DOCUMENTS

| 6,650,385 | B1 * | 11/2003 | Liu ........................ 349/113 |
| 7,196,755 | B2 * | 3/2007 | Sakamoto et al. ........... 349/113 |
| 2001/0038426 | A1 * | 11/2001 | Bechtel et al. ............. 349/71 |
| 2002/0145687 | A1 * | 10/2002 | Mitsui et al. ............. 349/113 |
| 2004/0027517 | A1 * | 2/2004 | Chol et al. ............... 349/113 |
| 2005/0078242 | A1 * | 4/2005 | Park et al. ............... 349/113 |
| 2006/0139520 | A1 * | 6/2006 | Ryu, II .................. 349/113 |

* cited by examiner

*Primary Examiner*—Andrew Schechter
*Assistant Examiner*—Paisley L Arendt

(57) ABSTRACT

Disclosed is a reflective type liquid crystal display device. The liquid crystal display device includes: an upper substrate provided with a polarizing plate on one surface of the upper substrate; a lower substrate spaced away from the other surface of the upper substrate; a liquid crystal layer disposed between the upper and lower substrates; a color filter layer formed at a portion on the other surface of the upper substrate; a self-luminous body coated side by side with the color filter layer in a region besides a pixel region on the other surface of the upper substrate, so as to radiate light by itself depending on the electric current; and a transparent ITO layer covered on the color filter layer and the self-luminous body. It is possible to operate the liquid crystal display device without degradation of reflection efficiency in a dark state wherein light introduced from outside is weak.

15 Claims, 2 Drawing Sheets

LIQUID CRYSTAL DISPLAY DEVICE COMPRISING A FILTER LAYER LYING IN A SAME PLANE AS A SELF-LUMINOUS BODY INCLUDING A FIRST ELECTRODE, AN ORGANIC SUBSTANCE LAYER AND A SECOND ELECTRODE

BACKGROUND OF THE INVENTION

1. Field of the invention

The present invention relates to a reflective type liquid crystal display device, and more particularly to a reflective type liquid crystal display which contains a self-luminous body so as to use the self-luminous body together with natural light as light sources.

2. Description of the Prior Art

Liquid crystal display devices are classified into three types of liquid crystal display device, namely, a transmissive type liquid crystal display device using a backlight as a light source, a reflective type liquid crystal display device using an outer light source, such as natural light from sunlight, or an electric lamp as a light source, and a transflective type liquid crystal display device having advantages of both the transmissive and reflective type liquid crystal display devices, and is used for a mobile phone, etc., which is usually exposed to an outer light source.

Among the liquid crystal display devices, since the reflective type liquid crystal display device uses outer artificial light or natural light as a light source, the reflective type liquid crystal display device has a problem of scarcely displaying image in a dark state wherein the natural light is weak in night or there is no the artificial light source.

Accordingly, the transflective type liquid crystal display device has been proposed in order to solve the problem of the reflective liquid crystal display device. The transflective type liquid crystal display operates using an internal light source which is mounted therein, in a dark state wherein the light from the outer light source is weak or does not exist, while operating using the outer light source in a bright state wherein the light from the outer light source is sufficient.

However, such a transflective type liquid crystal display device must also have a transmissive region and a reflective region formed in each pixel. Thus, there is a disadvantage in that the transflective type liquid crystal display device has the reduced reflection efficiency as compared with the reflective liquid crystal display device. Further, there is another problem in that the image quality is degraded by a difference between the light path for the light transmitted from the internal source and the light path for the light transmitted from the outer light source and reflected.

SUMMARY OF THE INVENTION

Accordingly, the present invention has been developed in order to solve the above-mentioned problems occurring in the prior art, and an object of the present invention is to provide a reflective type liquid crystal display device which is capable of displaying images in a dark state wherein light introduced from outside is weak.

In order to accomplish these objects of the present invention, there is provided a reflective type liquid crystal display device which comprises: an upper substrate provided with a polarizing plate on one surface of the upper substrate; a lower substrate spaced away from the other surface of the upper substrate; a liquid crystal layer disposed between the upper and lower substrates; a color filter layer formed at a portion on the other surface of the upper substrate; a self-luminous body which is coated side by side with the color filter layer in a region except for a pixel region on the other surface of the upper substrate, so as to radiate light by itself depending on electric current; and a transparent ITO (Indium Tin Oxide) layer covered on the color filter layer and the self-luminous body.

Here, the lower substrate includes an opaque metal source/drain formed on one surface of the lower substrate, an active region formed at a predetermined portion on one surface of the source/drain, an insulation layer covering the source/drain and the active region, and an opaque metal gate formed on one surface of the insulation layer and positioned over the active region.

Further, the source/drain is preferably formed over the entire pixel region and used as a pixel electrode.

Still further, the source/drain preferably has a plurality of embossed protuberance formed on one surface of the source/drain in order to improve the reflection efficiency of incidence light.

Preferably, the lower substrate includes an opaque metal gate formed at a portion on one surface of the lower substrate, an insulation layer formed on one surface of the lower substrate so as to cover the gate, an active region formed at a portion on one surface of the insulation layer and positioned over the gate, a source/drain formed at a portion of the insulation layer and connected to the active region, and a black matrix formed at a portion on the source/drain so as to cover the active region.

Further, the source/drain is preferably formed over the entire pixel region and used as a pixel electrode.

Still further, the source/drain preferably has a plurality of embossed protuberances formed on a surface of the source/drain.

Preferably, the self-luminous body includes an opaque negative electrode, an organic substance layer, and a positive electrode. Preferably, the ITO layer being used as the positive electrode.

Preferably, the light emitted from the self-luminous body is polarized light, which has polarizing component identical to that from the polarizing plate.

Further, the light from the self-luminous body has the same path as that of natural light which is incidence to the liquid crystal display layer.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
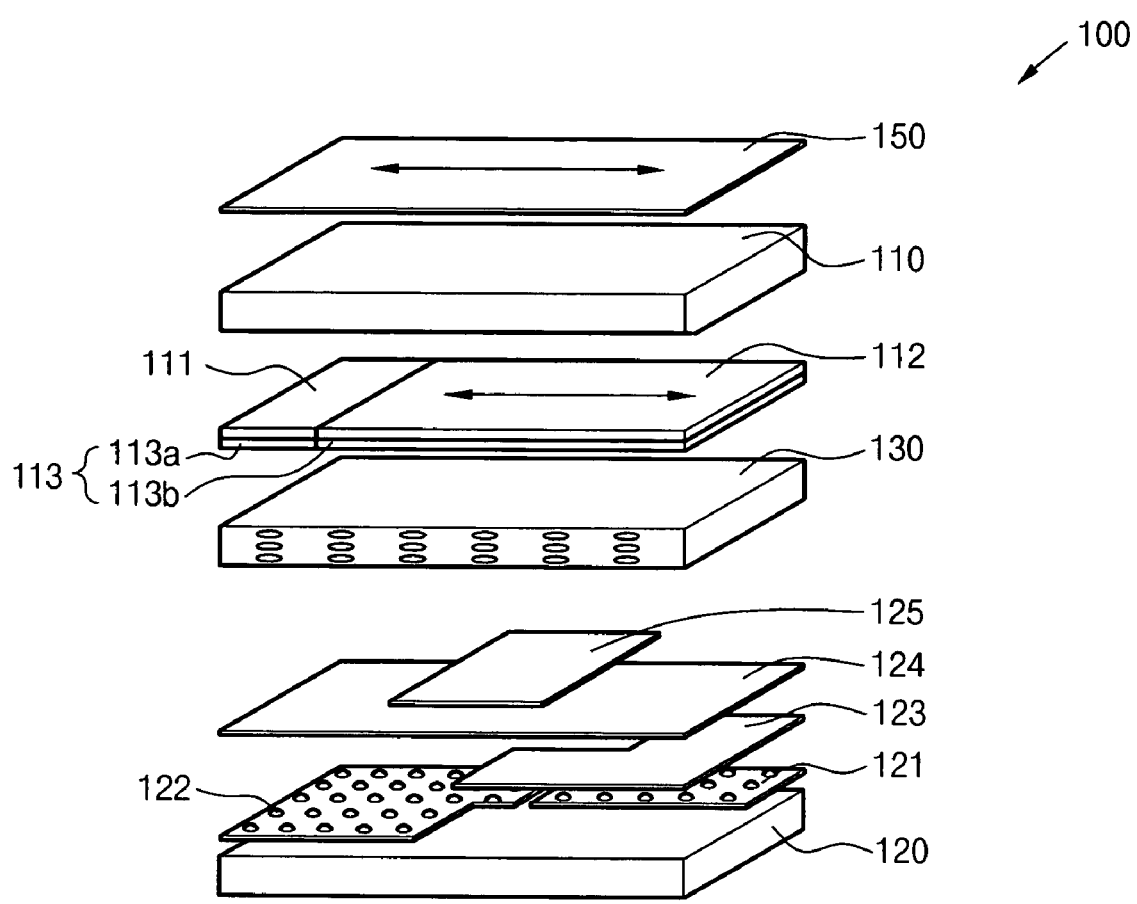
FIG. 1 is an exploded perspective view showing a reflective type liquid crystal display device according to the present invention.

FIG. 1 is an exploded perspective view showing a reflective type liquid crystal display device according to the present invention.

Referring to FIG. 1, the reflective type liquid crystal display device 100 includes an upper substrate 110, a lower substrate 120 spaced at a predetermined distance from the upper substrate 110 so as to face the upper substrate 110, and a liquid crystal display layer 130 interposed between the upper and lower substrates 110 and 120.

The upper substrate 110 is provided with a polarizing plate 150 on a surface thereof and a color filter layer 111 and a self-luminous body 112 on the other surface thereof. The color filter layer 111 and the self-luminous body 112 are formed side by side on the other surface of the upper substrate 110. An ITO (Indium Tin Oxide) layer is formed on the color filter layer 111 and the self-luminous body 112. Here, the self-luminous body 112 is formed in regions except for a pixel region.

Figure 2:
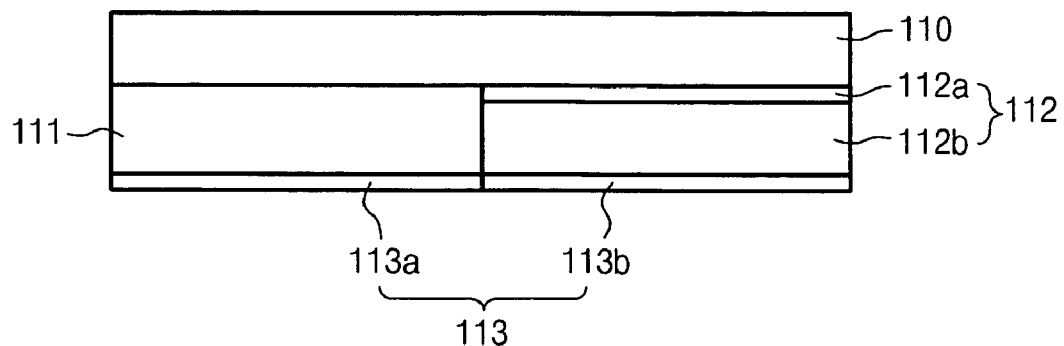
FIG. 2 is a sectional view showing an upper substrate of the reflective type liquid crystal display device according to the present invention shown in FIG. 1.

The self-luminous body 112 includes an opaque negative electrode 112a, an organic substance layer 112b, and a positive electrode 113b, as shown in FIG. 2. Herein, a portion of the transparent ITO 113 coated on the organic substance layer 112b is used as the positive electrode 113b so as to radiate light.

The self-luminous body 112 will be described in more detail. The organic substance layer 112b consists of a high molecular substance having an excellent fluorescent characteristic. When voltage is applied to the positive electrode 113b and the negative electrode 112a, the transparent positive electrode 113b injects holes into the organic substance layer 112b and the negative electrode 112a formed of a metal having a small work function, such as Al, Mg, Ca, etc., injects electrons into the organic substance layer 112a, so that the holes and electrons are bonded to each other in the organic substance layer 112b so as to form excitons.

At this time, light corresponding to energy gap is generated and radiated through the transparent positive electrode 113b.

That is, as current is supplied to the organic substance layer 112b in the self-luminous body 112, the organic substance 112b generates light by itself, and then radiates light having the same path as that of outer light.

In the present invention, organic light emitting diodes are used as the self-luminous body 112. The organic light emitting diodes are provided on the other surface of the upper substrate 110 facing the liquid crystal layer 130 and alternately arranged along with the color filter layer 111.

The self-luminous body 112 is used as a replacement of a black matrix which isolates light leakage in the conventional reflective type liquid crystal display device. The self-luminous body 112 has the negative electrode 112a made of the opaque metal and formed on the other surface of the upper substrate 110, the organic substrate layer 112b formed on the negative electrode 112a, and the transparent ITO layer 113 formed on the organic substance layer 112b and used as the positive electrode 113b.

Furthermore, the self-luminous body 112 can be used as a replacement of the conventional black matrix, since the negative electrode 112a is made from opaque metal which can prevent disclination of the liquid crystals from causing light leakage.

On the other hand, the ITO layer 113 may be independently formed on the organic substance layer 112b after the organic substance layer 112b is stacked in a process of manufacturing the reflective type liquid crystal display device. However, the ITO layer 113 may be integrally formed on the color filter layer 111 and the organic substance layer 112b after the color filter layer 111 and the organic substance layer 112b are stacked on the upper substrate 110.

That is, the ITO layer 113, which is formed on the self-luminous body 112 and the color filter layer 111, is the positive electrode 113b of the self-luminous body 112 and used as a common electrode 113a in the reflective type liquid crystal display device.

Since the self-luminous body 112 is made from high molecular material having characteristic in that a one dimensional polymer chain is aligned so as to emit light, the self-luminous body 112 can radiate polarized light without a polarizing plate. The polarized light has the same components as that of the light from the polarizing plate 150 provided on one surface of the upper substrate 110.

Accordingly, the polarized light emitted from the self-luminous body 112 and double refraction of the liquid crystal cause the screen to display colors.

On the other hand, since the self-luminous body 112, including the organic light emitting devices, is provided with thin film transistors, it can be used in an active matrix mode wherein all dots emit the light. However, the self-luminous body 112 may be used in a passive matrix mode in which the dots sequentially emit the light.

When outer light, to be used as a light source of the reflective type liquid crystal display device, does not exist or its intensity is weak, the reflective type liquid crystal display device cannot operate in this dark state. Therefore, the self-luminous body 112 is provided on the other surface of the upper substrate 110, so that the reflective type liquid crystal display device operates by the light emitted from the self-luminous body in the dark state when the electric current is applied.

Figure 3:
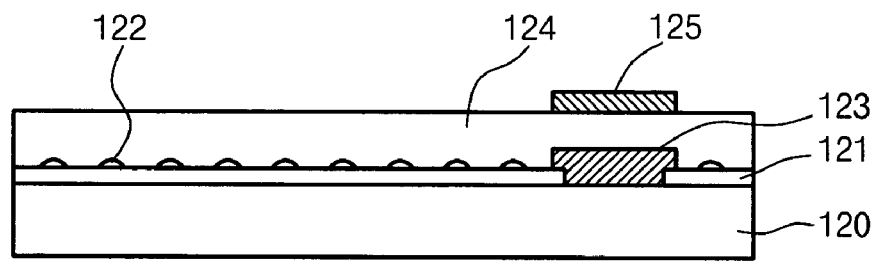
FIG. 3 is a sectional view showing a lower substrate of the reflective type liquid crystal display device according to the present invention shown in FIG. 1.

The lower substrate 120 has an opaque metal source/drain 121 formed on one surface thereof, as shown in FIG. 3. An active region 123 is formed in the source/drain 121. An insulation layer 124 is formed to cover the active region 123. Then, a gate 125 made of an opaque metal is arranged positioned on the insulation layer 124 in such a manner that the gate 125 overlaps with corresponds to the active region 123.

The reason that the gate made from the opaque metal is located to overlap and cover the active region is to arrange the self-luminous body 112 instead of the black matrix on the liquid crystal layer 130, thereby intercepting the light emitted from the self-luminous body 112 from being shed on the active region 123 and preventing light leakage current in the thin film transistor within the active region.

On the other hand, the source/drain 121 is formed on the whole pixel region and used as a reflecting plate for reflecting the light from the self-luminous body 112 or the outer light source. Furthermore, the source/drain 121 may be used as a pixel electrode.

As described above, since the liquid crystal display device according to the present invention is a total reflective type liquid crystal display device, the source/drain 121 has a remarkably reduced surface-resistance so as to reduce the RC delay, as compared with the ITO layer used as a pixel electrode in a transflective liquid crystal display device when the source/drain 121 is formed in a whole pixel region and used as the pixel electrode.

Here, a plurality of embossed protuberances may be formed on the source/drain 121 in order to increase the efficiency of the source/drain 121 as the reflecting plate.

A plurality of embossed protuberances may also be formed on the gate 125. This is to increase the reflection efficiency of the gate 125 because the gate 125 intercepts the light progressing to the active region 123 while playing the role of reflecting the introduced light.

Meanwhile, the insulation layer 124 may be formed on the source/drain 121 to cover only the active region in a manner different from the above description.

Figure 4:
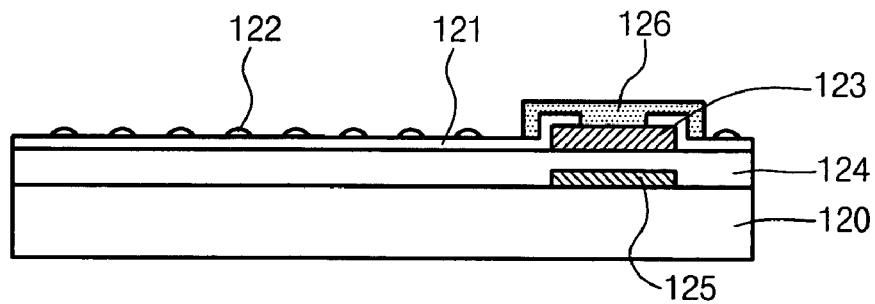
FIG. 4 is a sectional view showing another example of the lower substrate of the reflective type liquid crystal display device according to the present invention shown in FIG. 1.

FIG. 4 is a sectional view showing another example of the lower substrate of the reflective type liquid crystal display device according to the present invention. The lower substrate 120 includes an opaque metal gate 125 formed at a portion thereof, an insulation layer 124 formed on one surface of the lower substrate 120 to cover the gate 125, and an active region 123 formed on the insulation layer 124 to correspond to the gate 125.

Further, an opaque metal source/drain 121 is formed on the insulation layer 124 and connected to the active region 123, while a black matrix 126 is formed on the source/drain 121 to cover the active region 123.

Herein, the black matrix 126 acts as an insulation layer to intercept the light introduced from the self-luminous body 112 or the outer light source into the active region 123.

On the other hand, a plurality of embossed protuberances 122 may be formed on the source/drain 121 and the black matrix 126 in order to increase the reflection efficiency.

If the outer light source exists to sufficiently display images, the reflective type liquid crystal display device, constructed as described above, displays the image using only the outer light source. However, if the outer light source necessary to display the image does not exist, the liquid crystal display device can display the image using the self-luminous body as an internal light source.

The operation of the reflective type liquid crystal display device will be described below, concerning whether or the outer light source exists.

In a case where the liquid crystal display device displays the image using an outer light source, the light transmitted through a polarizing plate from the outer light source passes through the color filter and the liquid crystal layer, which in turn is reflected by the source/drain acting as the reflecting plate, in a white state. The reflected light passes through the liquid crystal layer again and is discharged outside while displaying the image.

On the other hand, the light emitted from the self-luminous body as the internal light source, i.e. the organic light emitting diodes, is the polarized light which is not polarized by a polarizing plate but polarized by itself. The polarized light passes through the liquid crystal layer and is reflected by the source/drain, which in turn passes through the liquid crystal layer again and is transmitted outside so as to display image as the outer light source displays the image.

This is because the self-luminous body has a polarized component identical to that of the polarizing plate, and the light from the self-luminous body has the same light path as that of the light from the outer light source.

The reflective type liquid crystal display device, constructed as described above, can maximize the light efficiency as having the outer light source and the internal light source having an identical light path with that of the outer light source. Further, since the reflective region and the transmissive region need not be formed in a pixel, it is unnecessary to consider an area of the transmissive region to the reflective region. Especially, the reflective type liquid crystal display device can be suitably used as a display device, in which the black matrix has a large area in comparison with pixel size, such as mobile display.

Furthermore, since a backlight such as Cold Cathode Fluorescent Lamp (CCFL) or Light Emitting Diode (LED) is not used in the liquid crystal display, it is possible to reduce the total thickness of the liquid crystal display device.

According to the present invention as described above, the reflective type liquid crystal display device has the upper substrate including the self-luminous body used as the internal light source and formed on the upper substrate, in which the self-luminous body has the same light path as that for the outer light source. Thus, the reflective type liquid crystal display device has an advantage of operating without the degradation of the reflection efficiency in a dark state where the outer light source is weak.

While a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A liquid crystal display device comprising:
    an upper substrate provided with a polarizing plate on a first surface of the upper substrate;
    a lower substrate spaced away from a second surface of the upper substrate;
    a liquid crystal layer disposed between the upper and lower substrates;
    a substantially planar filter layer lying in a plane located between the upper substrate and the liquid crystal layer;
    a self-luminous body located between the upper substrate and the liquid crystal layer, the self-luminous body lying in the same plane as the filter layer; and
    a transparent layer covered on the filter layer and the self-luminous body,
    wherein the self-luminous body includes a first electrode, an organic substance layer, and a second electrode, the transparent layer being used as the second electrode.

2. The liquid crystal display device as claimed in claim 1, wherein the lower substrate includes an opaque metal source/drain formed on one surface of the lower substrate, an active region formed at a predetermined portion on one surface of the source/drain, an insulation layer covering the source/drain and the active region, and an opaque metal gate formed on one surface of the insulation layer and positioned over the active region.

3. The liquid crystal display device as claimed in claim 2, wherein the source/drain comprises a pixel electrode.

4. The liquid crystal display device as claimed in claim 2, wherein the source/drain has a plurality of embossed protuberances formed on one surface of the source/drain.

5. The liquid crystal display device as claimed in claim 1, wherein the lower substrate includes a substantially opaque metal gate formed at a portion on one surface of the lower substrate, an insulation layer formed on one surface of the lower substrate so as to cover the gate, an active region formed at a portion on one surface of the insulation layer and positioned over the gate, a source/drain formed at a portion of the insulation layer and connected to the active region, and a black matrix formed at a portion on the source/drain so as to cover the active region.

6. The liquid crystal display device as claimed in claim 5, wherein the source/drain comprises a pixel electrode.

7. The liquid crystal display device as claimed in claim 5, wherein the source/drain has a plurality of embossed protuberances formed on a surface of the source/drain.

8. The liquid crystal display device as claimed in claim 1, wherein light emitted from the self luminous body is polarized light and has a component having a polarization substantially identical to a polarization of the polarizing plate.

9. The liquid crystal display device as claimed in claim 1, wherein light from the self-luminous body has follows a light path substantially the same as that of light on the liquid crystal display layer.

10. The liquid crystal display device of claim 1, wherein the filter layer is a color filter layer.

11. The liquid crystal display device of claim 10, wherein the color filter layer and the self-luminous body are adjacent to each other.

12. The liquid crystal display device of claim 1, wherein the filter layer and the self luminous body are adjacent to each other.

13. The liquid crystal display device of claim 1, wherein the transparent layer is comprised of indium tin oxide.

14. The liquid crystal display device of claim 13, wherein the first electrode is opaque.

15. The liquid crystal display device of claim 1, wherein the first electrode is opaque.

* * * * *